C. JENKINS.
STOP VALVE.

No. 181,267.  Patented Aug. 22, 1876.

WITNESSES
Frank G. Parker
Adolph J. Oettinger

INVENTOR
Charles Jenkins
by his atty
Thos. Wm. Clarke

UNITED STATES PATENT OFFICE.

CHARLES JENKINS, OF BOSTON, MASSACHUSETTS.

IMPROVEMENT IN STOP-VALVES.

Specification forming part of Letters Patent No. 181,267, dated August 22, 1876; application filed July 31, 1876.

*To all whom it may concern:*

Be it known that I, CHARLES JENKINS, of Boston, Massachusetts, have invented an Improvement in Valves, of which the following is a specification:

This invention relates to straight-way valves. Its nature consists in the combination, with the shell of a valve, of a straight and inclined guide, between which the gate slides to close the water-ways, and in the combination, with the gate, of a peculiar casing-piece, packing-piece, and binding-piece, of metal, and a compression-packing, all operating in combination with the guides of the gate.

Figure 2:
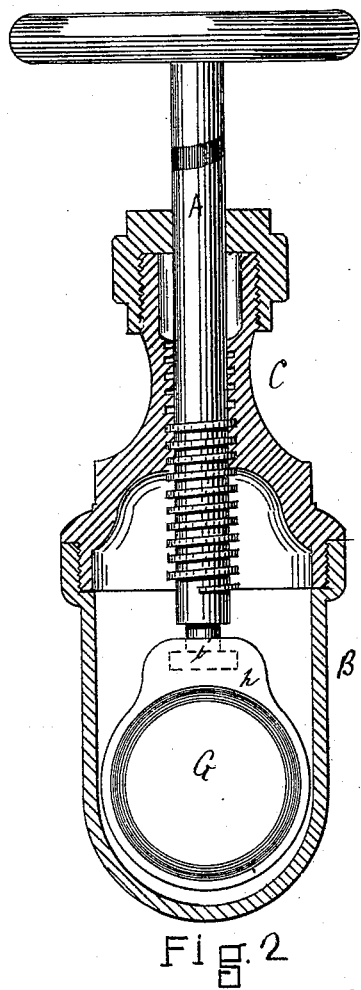
Figure 1:
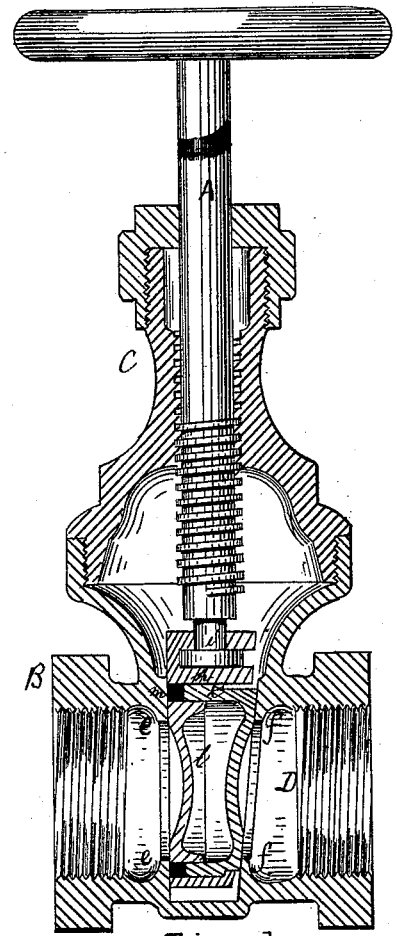
Figure 3:
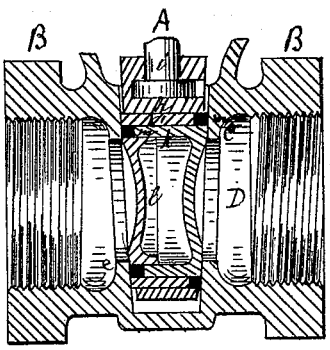

In the drawing, Figure 1 is a vertical longitudinal section, Fig. 2 is a vertical transverse section, and Fig. 3 a vertical longitudinal section, of a valve embodying my invention.

A is the stem. B is the shell. C is the bonnet. D is the water-way. e is the metallic seat. f is the abutment. G is the gate—a composite structure composed of a casing-piece, h, on the valve-stem side of which is a swivel, i, attaching it to the valve-stem. The diaphragm containing the metallic seat e is preferably placed so that the seat shall be at right angles to the water-way D, and the abutment f is inclined across the water-way, so as to make a frustum of a wedge-shaped cavity, intersecting the water-way and forming the guides for the gate which is to close it. Inside the casing-piece h is placed a ring of compression-packing, m, and inside of that a binding-piece, l. Behind the packing m is the metallic packing-piece, k, the back of which is inclined to correspond with the abutment f.

The parts of the gate G being fitted together and attached to the stem A, placed in position, and the bonnet on, on revolving the stem to close the water-way the inclined back of the packing-piece k, coming in contact with the abutment f, compresses the packing m on the seat e perpendicularly to the seat.

Fig. 3 illustrates a valve with inclined valve-seats on each side the gate. It will be understood from what has been said above.

It will be seen that this valve is simple, cheap, easily repaired, light, and effective.

I claim—

1. The combination, in the gate of a straight-way valve, of the casing-piece h, packing m, packing-piece k, and binding-piece l, all as and operating substantially as described.

2. The combination of the inclined abutment f, valve-seat e, packing m, and packing-piece k, moved and operated by the valve-stem A, substantially as described.

CHARLES JENKINS.

Witnesses:
  THOS. WM. CLARKE,
  ADOLPH. J. OETTINGER.